(12) United States Patent
Liu et al.

(10) Patent No.: US 11,807,119 B2
(45) Date of Patent: Nov. 7, 2023

(54) ELECTRICAL POWER SYSTEMS

(71) Applicant: Rolls Royce plc, London (GB)

(72) Inventors: Xiong Liu, Derby (GB); Michael A Zagrodnik, Derby (GB); Amit K Gupta, Derby (GB)

(73) Assignee: ROLLS-ROYCE plc, London (GB)

( * ) Notice: Subject to any disclaimer, the term of this patent is extended or adjusted under 35 U.S.C. 154(b) by 91 days.

(21) Appl. No.: 17/451,963

(22) Filed: Oct. 22, 2021

(65) Prior Publication Data

US 2022/0126713 A1    Apr. 28, 2022

(30) Foreign Application Priority Data

Oct. 27, 2020   (GB) ...................................... 2017010

(51) Int. Cl.
*B60L 53/20* (2019.01)
*H02J 7/14* (2006.01)
(Continued)

(52) U.S. Cl.
CPC ............. *B60L 53/20* (2019.02); *B60W 10/08* (2013.01); *B60W 10/26* (2013.01); *H02J 7/143* (2020.01)

(58) Field of Classification Search
CPC ......... B60L 53/20; H02J 7/143; B60W 10/08; B60W 10/26
(Continued)

(56) References Cited

U.S. PATENT DOCUMENTS

2004/0238243 A1    12/2004   King et al.
2014/0316593 A1*   10/2014   Taimela ................. H02J 3/241
                                                          700/287
(Continued)

FOREIGN PATENT DOCUMENTS

EP        2385602 A2    11/2011
EP      2 987 673 A1     2/2016
(Continued)

OTHER PUBLICATIONS

Feb. 24, 2022 extended Search Report issued in European Patent Application No. 21199037.9.

*Primary Examiner* — Yi-Kai Wang
(74) *Attorney, Agent, or Firm* — Oliff PLC

(57) ABSTRACT

Electrical power systems having variable-voltage DC busses and methods of controlling voltage settings of such busses. One electrical power system comprises: a variable-voltage DC bus; a number N≥2 of electrical machines, each electrical machine connected to the variable-voltage DC bus via one of a corresponding number N of converters, each electrical machine and corresponding converter having an index n=(1, . . . , N); and a controller configured to select a voltage setting $V_{dc\_bus}$ for the variable-voltage DC bus and to provide control signals to the converters to control the voltage setting of the variable-voltage DC bus according to the selected voltage setting $V_{dc\_bus}$. The controller configured to select a voltage setting $V_{dc\_bus}$ greater than or equal to a minimum voltage requirement $V_{dc\_min}$ for the bus. The controller is configured to determine the minimum voltage requirement $V_{dc\_min}$ using present operating speeds of each of the N electrical machines.

20 Claims, 7 Drawing Sheets

(51) Int. Cl.
*B60W 10/08* (2006.01)
*B60W 10/26* (2006.01)

(58) Field of Classification Search
USPC .......................................... 701/22
See application file for complete search history.

(56) References Cited

U.S. PATENT DOCUMENTS

2016/0052423 A1* 2/2016 Zhou ................ B60L 15/06
701/22
2016/0294274 A1* 10/2016 Wennerstrom ...... H01F 27/2823
2021/0339877 A1* 11/2021 Salanne ................ B60L 58/10

FOREIGN PATENT DOCUMENTS

| | | |
|---|---|---|
| EP | 3594123 A1 | 1/2020 |
| WO | 2009/075188 A1 | 6/2009 |
| WO | 2012/123663 A1 | 9/2012 |

* cited by examiner

ELECTRICAL POWER SYSTEMS

CROSS-REFERENCE TO RELATED APPLICATIONS

This application claims priority pursuant to 35 U.S.C. 119(a) to United Kingdom Patent Application No. 2017010.6, filed Oct. 27, 2020, which application is incorporated herein by reference in its entirety.

TECHNICAL FIELD

This disclosure concerns electrical power systems having variable-voltage DC busses and methods for controlling voltage settings of variable-voltage DC busses. The electrical power systems may be particularly suitable for, but are not limited to, use in aircraft, marine vessels or trains.

BACKGROUND

As the need to reduce carbon emissions grows and electrical technologies develop, interest in hybrid electric platforms and so-called 'more electric' platforms is increasing. Hybrid platforms use both internal combustion engines, for example reciprocating engines or gas turbine engines, and electrical machines to provide propulsive power. More electric platforms primarily or exclusively use internal combustion engines for propulsive power, but make increased use of electrical power to power systems which previously, typically, have not been electrically powered. More electric platforms may also use electrical machines to facilitate engine starting or the transfer of mechanical power between engine shafts in gas turbines, for example.

These platforms will typically need to make use of high voltage (HV) electrical distribution busses to deliver electrical power to propulsive and/or non-propulsive loads. This is especially the case for aircraft, marine vessels and trains, which are typically much larger than, for example, cars and have higher power requirements that necessitate higher voltages.

Many proposed designs use a fixed-voltage DC bus. There are some advantages associated with a fixed bus voltage, including relative simplicity of design and operation. There are, however, a number of disadvantages. Some of these disadvantages arise because the fixed voltage must be rated based on the maximum load power requirement, which results in the bus operating at a much higher voltage than is necessary for some or even the majority of the time. Whilst a high voltage advantageously reduces resistive losses in distribution cabling, it can increase semiconductor switching losses in converter circuitry and has implications in terms of safety and component life.

One alternative approach is to use a variable-voltage DC bus. In use, the voltage setting of the variable-voltage bus can be increased to meet high power requirements when necessary, whilst at other times the voltage setting can be reduced to reduce semiconductor losses, component wear and the like. Whilst this approach clearly provides some advantages, there are trade-offs in terms of complexity and the need to provide control of the bus voltage.

European patent application publication EP 2385602 A2 describes an electrical power system with a variable-voltage DC bus. The DC bus is supplied with current by a plurality of synchronous generators and associated rectifiers, the outputs of which are connected in series. The rectifiers are wholly or substantially passive in their design and the magnitude of the voltage on the DC bus depends on the speed of rotation of the generator rotors.

The paper "Variable-Voltage Bus Concept for Aircraft Electrical Power System" by Seang Shen Yeoh et al (*IEEE Transactions on Industrial Electronics*, Vol. 66, No. 7, July 2019) describes an aircraft electrical power system with two busses: a fixed-voltage DC bus for powering sensitive electrical loads and a separate variable-voltage DC bus for powering a variable power resistive load, specifically an electrical anti-icing system. The paper describes dynamic control of the voltage on the variable-voltage bus.

SUMMARY

The invention is directed towards an electrical power system having a variable-voltage DC bus and to a method of controlling the voltage setting of such a bus. The electrical power system may be included in a vehicle, particularly but not exclusively an aircraft, a marine vessel such as a boat or a ship, or a train and may form part of the propulsion system of the vehicle.

According to a first aspect, there is provided an electrical power system having a DC bus with a variable-voltage setting. The electrical power system comprises: a variable-voltage DC bus; a number N≥2 of electrical machines, each electrical machine connected to the variable-voltage DC bus via one of a corresponding number N of converters, each electrical machine and corresponding converter having an index n=(1, . . . , N); and a controller configured to select a voltage setting $V_{dc\_bus}$ for the variable-voltage DC bus and to provide control signals to the converters to control the voltage setting of the variable-voltage DC bus according to the selected voltage setting $V_{dc\_bus}$. A number P≥1 of the N electrical machines are configured as generators and the corresponding P converters are configured as AC-DC converters, each generator being operable to generate alternating current and to deliver direct current to the variable-voltage DC bus via the corresponding one of the AC-DC converters. A remaining number N−P≥0 of the N electrical machines are configured as motors and the corresponding N−P converters are configured as DC-AC converters, each motor being operable to receive alternating current from the variable-voltage DC bus via the corresponding one of the DC-AC converters. The controller is configured to select a voltage setting $V_{dc\_bus}$ greater than or equal to a minimum voltage requirement $V_{dc\_min}$ for the bus, the controller being configured to determine the minimum voltage requirement $V_{dc\_min}$ using present operating speeds of each of the N electrical machines.

The controller may be configured to select a voltage setting $V_{dc\_bus}$ greater than $V_{dc\_min}$ to provide a margin for dynamic control of the voltage on the variable-voltage dc bus. The controller may be configured to select a voltage setting $V_{dc\_bus}$ satisfying $V_{dc\_min} < V_{dc\_bus} < 1.1 V_{dc\_min}$, preferably $1.03 V_{dc\_min} < V_{dc\_bus} < 1.07 V_{dc\_min}$, more preferably $V_{dc\_bus} = 1.05 V_{dc\_min}$.

The number P of the N electrical machines configured as generators may greater than or equal to 2, such that an amount of electrical power delivered to the variable-voltage DC bus is shared amongst a plurality P of generators.

The number of electrical machines configured as motors, N−P, may be greater than or equal to 1, optionally greater than or equal to 2.

At least one of, optionally each of, the N electrical machines may be configured as a variable speed electrical machine.

The electrical power system may further comprise at least one rotary engine having a drive shaft. Each of the P generators may have a rotor drivably coupled to a drive shaft of one of the at least one rotary engines. The at least one rotary engine may be a gas turbine engine or a reciprocating engine.

According to a second aspect, there is provided a method of controlling a voltage setting of a variable-voltage DC bus in an electrical power system comprising a number N≥2 of electrical machines, each electrical machine connected to the variable-voltage DC bus via one of a corresponding number N of converters. The method comprises: receiving, by a controller, for each of the N electrical machines, an indication of a present operating speed of the electrical machine; determining, by the controller, using the indications of the present operating speeds of all of the N electrical machines, a minimum voltage requirement $V_{dc\_min}$ for the bus; selecting, by the controller, a voltage setting $V_{dc\_bus}$ for the variable-voltage DC bus that is greater than or equal to the minimum voltage requirement $V_{dc\_min}$; and providing, by the controller, control signals to the converters to control the voltage setting of the variable-voltage DC bus according to the selected voltage setting $V_{dc\_bus}$.

A controller according to the first aspect is also provided.

A vehicle propulsion system comprising an electrical power system according to the first aspect is also provided, as is a vehicle comprising the vehicle propulsion system.

A computer program comprising instructions for performing the method of the second aspect is also provided, as is a non-transitory computer-readable storage medium having instructions stored thereon for performing the method of the second aspect.

It will be understood that the term "operating speed" of an electrical machine refers to the speed of rotation of the rotor of the machine or a value dependent thereon or related thereto. For instance, it will be appreciated by those skilled in the art that in a synchronous machine, the frequency of rotation of the rotor is proportional to the frequency of the alternating current in the stator of the machine and the inverse of the number of machine poles. As a result, the ac frequency could be used in place of the speed of rotation. Other suitable variables dependent on or related to the machine rotor speed will occur to those skilled in the art.

BRIEF DESCRIPTION OF THE DRAWINGS

Embodiments will now be described by way of example only with reference to the accompanying drawings, which are purely schematic and not to scale, and in which.

DETAILED DESCRIPTION

FIG. 1

Figure 1:
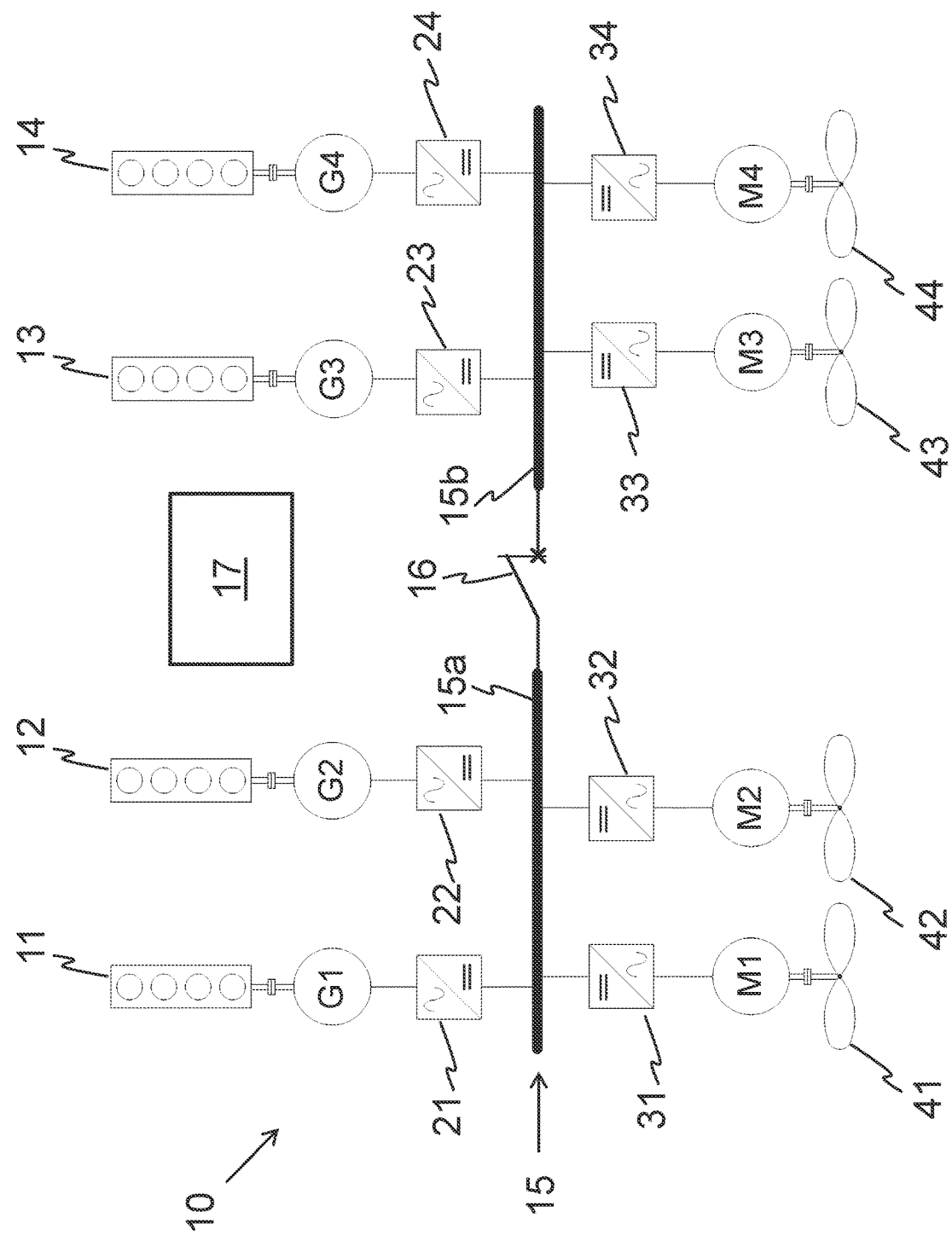
FIG. 1 is a schematic illustration of a distributed propulsion system incorporating an electrical power system having a variable-voltage DC bus.

FIG. 1 illustrates a distributed propulsion system 10 such as may be used in a hybrid electric vehicle, for example a hybrid electric aircraft or marine vessel.

The exemplary propulsion system 10 includes four internal combustion engines 11, 12, 13, 14, which may be reciprocating engines (diesel engines, for example) or gas turbine engines. Each engine 11-14 has an output drive shaft that is drivably coupled to a rotor of one of the four illustrated generators G1, G2, G3, G4. In this specific example, each generator G1-G4 is a three-phase permanent magnet synchronous generator. Thus, the rotation of the rotor of each generator G1-G4, driven by the drive shaft of the corresponding engine 11-14, generates three-phase alternating current in a corresponding stator of the generator G1-G4.

The alternating current generated in the stator of the generator G1-G4 is output to one of the illustrated AC-DC converters 21, 22, 23, 24, commonly known as rectifiers. The rectifiers 21-24, which in this case are active front end (AFE) rectifiers, receive the alternating current output by the generators G1-G4 and convert it to direct current. The direct current is output to a common DC bus 15 that is connected to the outputs of all of the rectifiers 21-24.

The exemplary propulsion system 10 also includes four propulsors 41, 42, 43, 44 for providing propulsive thrust. The propulsors 41-44 may be ducted fans, marine propulsors or the like. Each propulsor has a drive shaft which is driven by a rotor of one of the four illustrated motors M1, M2, M3, M4. In this specific example, each motor M1-M4 is a three-phase permanent magnet synchronous motor. Thus, a corresponding stator of each motor M1-M4 receives three-phase alternating current which excites a stator magnetic field. The stator magnetic field interacts with a rotor magnetic field generated by permanent magnets of the rotor, which drives the rotation of the rotor of the motor M1-M4.

The motors M1-M4 receive the three-phase current from the DC-AC converters 31, 32, 33, 34, commonly known as inverters. The inverters 31-34, which in this case take the form of variable frequency drives (VFDs), draw direct current from the common bus 15 to which they are all connected, and convert the direct current into alternating current which is output to the stators of the motors M1-M4.

Thus, the drive shafts of the engines 11-14 are driven by the combustion of fuel and thereby drive rotation of the rotors of the generators G1-G4, whose stators in turn supply the DC bus 15 with electrical power via the rectifiers 21-24. The rotations of the drive shafts of the propulsors 41-44 are driven by the rotors of the motors M1-M4, whose stators draw electrical power from the DC bus 15 via the inverters 31-34. In some embodiments, the DC bus 15 may also be connected to one or more energy storage units (not shown), for example batteries and/or capacitors, which are charged by or provide electrical power to the bus 15. Furthermore, the DC bus 15 may also deliver electrical power to non-propulsive loads (not shown), for example DC loads.

The DC bus 15 is illustrated in FIG. 1 as being formed of two bus portions 15a, 15b switchably connected in series by a switch 16. Specifically, a first bus portion 15a is associated with first and second engines 11-12; generators G1-G2 rectifiers 21-22; inverters 31-32; motors M1-M2; and propulsors 41-42, whilst a second bus portion 15b is connected to third and fourth engines 13-14; generators G3-G4 rectifiers 23-24; inverters 33-34; motors M3-M4; and propulsors 43-44. This may be the case where, for example, the elements of the first bus portion 15a are associated with engines and propulsors on one side of an aircraft and the elements of the second bus portion 15b are associated with engines and propulsors on the other side of the aircraft. In other embodiments the switch 16 is not present and the two bus portions 15a, 15b are permanently connected.

The DC bus 15 is a variable-voltage bus. The magnitude of the voltage on the variable-voltage bus 15 will depend primarily on the present operating parameters of the generators G1-G4 (particularly their operating speeds); the designs and specifications of the generators G1-G4 (winding arrangement, permanent magnet strength etc.); and the controlled parameters of the rectifiers 21-24 (duty cycle of the switches etc.).

The control of the rectifiers 21-24, and more generally the converters 21-24, 31-34 and the electrical machines G1-G4, M1-M4, is performed by a controller 17. The controller 17 is operably connected to the converters 21-24, 31-34 and the electrical machines G1-G4, M1-M4 and can provide control signals to them to control their operating parameters. In this way, the controller 17 is able to control the operation of the converters and the electrical machines and thereby also the voltage setting of the variable-voltage DC bus 15.

In the present embodiment, the controller 17 is an engine electronic controller (EEC) that also controls operating parameters of the engines 11-14. For example, the controller 17 may be a full-authority digital engine controller (FADEC), the configuration of which will be known and understood by those skilled in the art. A FADEC may control all aspects of the propulsion system 10 (i.e. the engines, electric machines and power electronics) and in this way may holistically respond to both thrust demand and electrical power demand. In other embodiments the controller 17 may be dedicated only to the control of the electrical power system, with one or more additional controllers (not shown) controlling the operation of the engines 11-14.

FIG. 2

Figure 2:
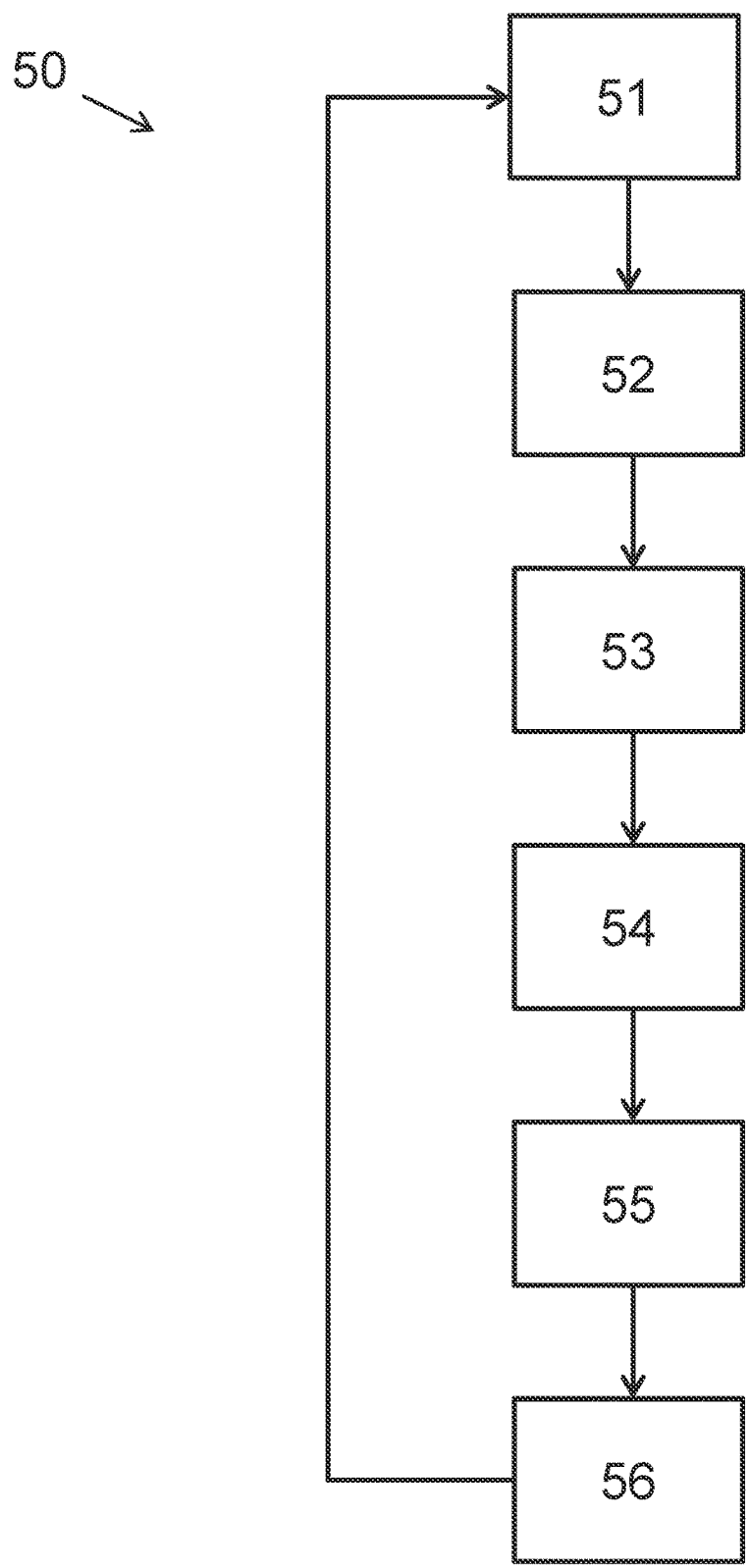
FIG. 2 is a flow chart illustrating a method of controlling a voltage setting of a variable-voltage DC bus.

FIG. 2 is a flow chart 50 illustrating how the controller 17 controls the distributed propulsion system of FIG. 1, including the control of the voltage setting of the variable-voltage DC bus 15.

The process begins at 51, where the controller 17 receives an indication of an amount thrust that must be provided by the propulsors 41-44. The amount of thrust required will vary over time, for example depending on the flight stage of an aircraft, with higher thrust being required during take-off and climb than during cruise.

Figure 5:
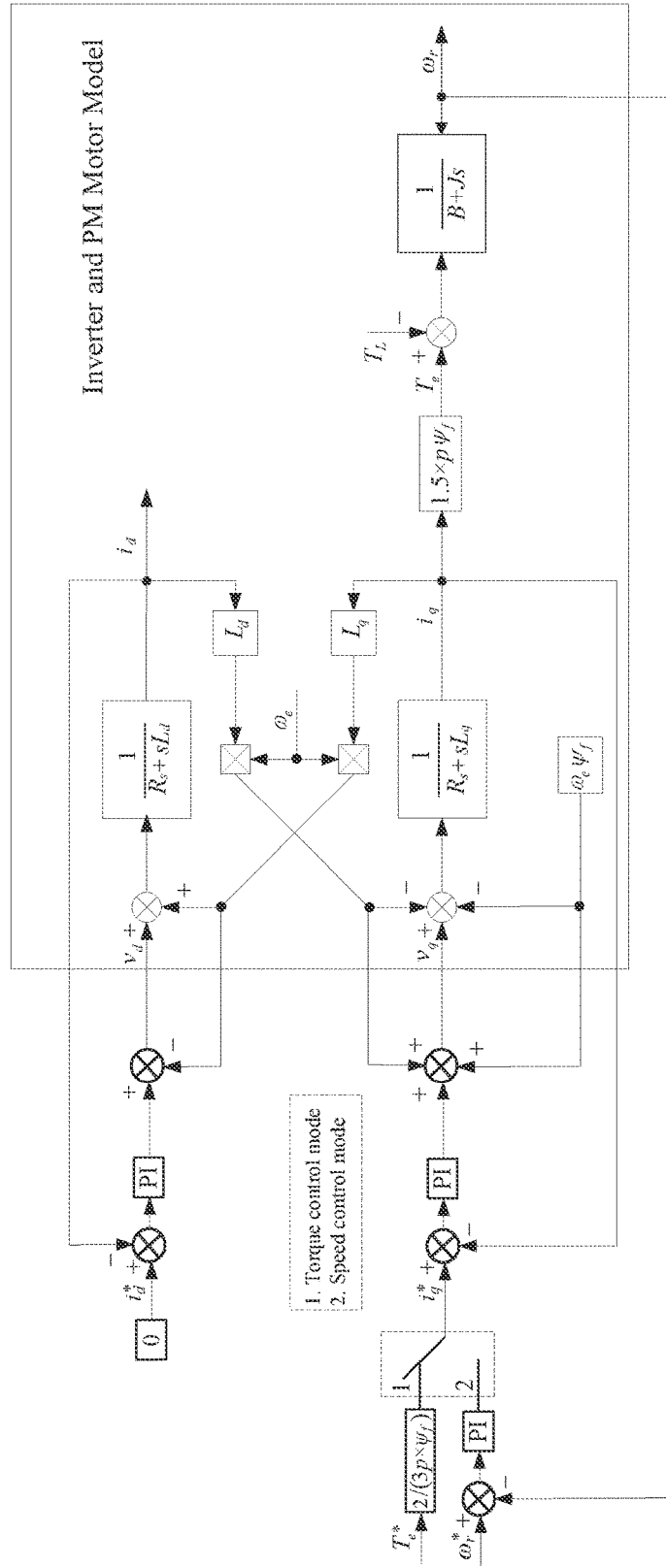
FIG. 5 is a schematic diagram illustrating a control scheme for controlling a permanent magnet synchronous motor and associated inverter in order to control the speed of the motor.

At 52, based on the thrust demand, the controller 17 determines suitable operating parameters, including operating speeds, for the motors M1-M4 and controls the motors M1-M4 and their inverters 31-34 to implement the determined operating parameters. The specific way in which the speeds of the motors M1-M4 are determined is beyond the scope of the present disclosure. However, an exemplary control scheme for controlling the currents drawn by the inverters 31-34 and the speeds of the permanent magnet synchronous motors M1-M4 is shown in FIG. 5 and will be described below.

At 53, having determined and set suitable operating speeds for the motors M1-M4, the controller 17 determines the total power demand of the electrical power system. The total power demand will include the electrical power consumed by the motors M1-M4 to meet the thrust demand, and possibly also electrical power consumed by other, non-propulsive, electrical loads connected to the DC bus 15.

At 54, based on the total power demand, the controller 17 determines operating parameters for the engines 11-14 suitable for delivering sufficient power to the DC bus 15 to meet the total electrical power demand. The controller 17 controls the engines 11-14 to implement the determined operating parameters.

The specific way in which the controller 17 determines and controls the operating parameters of the engines 11-14 is beyond the scope of the present disclosure. Typically, however, the controller will seek to share the power demand substantially equally between the engines 11-14 and at the same time select engine operating parameters (for example engine speed parameters) that optimize the specific fuel consumptions (SFCs) of the engines. In some cases, where the electrical power demand can be met by running only a subset of the engines 11-14, some of the engines may be stopped or otherwise disconnected from the generators G1-G4. This may be beneficial where the use of only a subset of the engines 11-14 allows the use of engine operating parameters that provide a better overall SFC. In other cases, all of the engines 11-14 may be used at all times even if the power demand could be met by only a subset of the engines 11-14.

Having determined and set appropriate operating parameters for the engines 11-14, it will be understood that operating speeds have also been set for the associated generators G1-G4. This is because the output drive shafts of the engines 11-14 drive the rotors of the generators G1-G4 and therefore set the generator rotor speeds. Thus, at this point in the control of the propulsion system 10, operating speeds have been set for each of the electrical machines in the electrical power system. That is, speeds have been set for both the set of motors M1-M4 and the set of generators G1-G4, the speeds being suitable for meeting the thrust demand and the overall system electrical power requirements whilst preferably also optimizing the engine SFCs.

Whilst the selection of suitable engine operating parameters, and thus also generator speeds, allows for the delivery of sufficient electrical power to the DC bus 15 to meet the system power requirements, it is still necessary to consider the voltage level on the variable-voltage DC bus 15. To some extent the voltage level will be set by the speed of the generators G1-G4. However, the controller 17 is still able to adapt the voltage setting, $V_{dc\_bus}$, by controlling the converters, particularly the duty cycles of the switches in the active front end rectifiers 21-24 that output current to the bus 15.

Thus, at 55, the controller selects a voltage setting $V_{dc\_bus}$ for the variable-voltage bus 15. Selection of the voltage setting $V_{dc\_bus}$ will now be described.

The voltage setting $V_{dc\_bus}$ is ideally set to a relatively low level, as this will reduce semiconductor switching losses in the AFE rectifiers 21-24 and in the VFD inverters 31-34. However, it is necessary to ensure the voltage setting $V_{dc\_bus}$ is high enough to deliver the required power to the loads. For safe, reliable operation the voltage level on the DC bus 15 should remain high enough under all relevant operating conditions.

According to the present disclosure, a constraint considered suitable for ensuring reliable operation of the electrical power system is that the voltage source converter (VSC) DC-link voltage must be greater than the terminal line to line voltage amplitude for all operating conditions and for all electrical machines connected to the variable-voltage bus 15. Thus, according to the present disclosure, in determining a lower bound $V_{dc\_min}$ for the bus voltage setting $V_{dc\_bus}$, due account must be taken of all of the electrical machines G1-G4, M1-M4 connected to the variable-voltage DC bus 15.

Machine stator terminal voltage has been found to be highly dependent on and almost in proportion to machine operating speed (assuming the voltage drop across the stator windings is small compared to the machine back EMF), and so a suitable lower bound $V_{dc\_min}$ can be determined, in a number of different ways, using the operating speeds of the machines G1-G4, M1-M4.

Thus, at 55, the controller 17 uses the operating speeds of all of the machines connected to the bus 15 to determine a minimum voltage requirement $V_{dc\_min}$ for the bus 15 and selects a voltage setting $V_{dc\_bus}$ greater than or equal to $V_{dc\_min}$.

In the following description, each of the N electrical machines and its associated converter is assigned a unique index, n, wherein n is an integer in the range 1 to N (n= (1, . . . , N)). In FIG. 1, N=8 (four generators 21-24 and associated AC-DC converters, plus four motors 51-54 and associated DC-AC converters 41-44), however any value of N greater than or equal to two could be used.

In one group of embodiments, for each and every one of the N electrical machines connected to the DC bus 15, the machine operating speed as determined by the controller 17 can be used to determine a minimum voltage requirement $V_{dc\_min\_n}$. The controller must then select a voltage setting $V_{dc\_bus}$ for the variable-voltage bus that is greater than or equal to $V_{dc\_min}$, which is given by equation (1):

$$V_{dc\_min} = \max(V_{dc\_min\_1}, \ldots, V_{dc\_min\_N}) \tag{1}$$

The specific way in which the machine voltage requirement $V_{dc\_min\_n}$ is determined from the machine operating speed may vary depending on implementation details, for instance the number of electrical phases of the machine. In one specific embodiment, using space vector modulation or third order harmonic injection for a voltage source converter with a maximum modulation index of 1.15, $V_{dc\_min\_n}$ can be calculated using equation (2):

$$V_{dc\_min\_n} = \sqrt{3} \times \sqrt{v_{sd\_n}^2 + v_{sq\_n}^2} \tag{2}$$

In equation (2), the values $v_{sd\_n}$ and $v_{sq\_n}$ are the speed-dependent values of the machine stator voltage, in the dq reference frame of the n-th machine. The dq (direct-quadrature) reference frame and the calculation of values using the dq reference frame, in this case using the phase magnitude invariance dq transformation method, will be understood by those skilled in the art.

In another group of embodiments, for each and every one of N machine-converter pairings connected to the DC bus 15, the machine operating speed as determined by the controller 17 can be used to determine a modulation index $m_n$. The maximum index $m_{max}$ can then be used to determine the minimum voltage requirement $V_{dc\_min}$. The controller 17 must then select a voltage setting $V_{dc\_bus}$ that is greater than or equal to $V_{dc\_min}$. This is summarized in equations (3) and (4):

$$m_{max} = \max(m_1, \ldots, m_N) \tag{3}$$

$$V_{dc\_min} = \frac{m_{max}}{k} V_{dc} \tag{4}$$

The value of k, which is a constant, may be set to 1.15, representing the theoretical maximum modulation index.

$V_{dc}$ is the converter DC-side voltage and will be the same for all of the converters because they are all connected to common bus 15. In other words, $V_{dc}$ is the present DC bus voltage, which can be determined by measurement.

The modulation indices $m_n$ may be determined using the dq reference frame values $m_{d\_n}$ and $m_{q\_n}$:

$$m_n = \sqrt{m_{d\_n}^2 + m_{q\_n}^2} \tag{5}$$

Assuming there is no filter between the n-th machine and its associated converter, the dq reference frame values $m_{d\_n}$ and $m_{q\_n}$ and thus the modulation index $m_n$ can be related to the values of $v_{sd\_n}$ and $v_{sq\_n}$, the machine stator voltage in the dq reference frame, using equations (6) and (7):

$$v_{sd\_n} = \tfrac{1}{2} V_{dc} \times m_{d\_n} \tag{6}$$

$$v_{sq\_n} = \tfrac{1}{2} V_{dc} \times m_{q\_n} \tag{7}$$

Equations (6)-(7) can be generalised to the case where there is, optionally, a filter between the n-th machine and its associated converter by substituting $v_{sd\_n}$ and $v_{sq\_n}$ with $v_{cd\_n}$ and $v_{cq\_n}$, the converter (rectifier or inverter) ac terminal voltages in the dq reference frame:

$$v_{cd\_n} = \tfrac{1}{2} V_{dc} \times m_{d\_n} \tag{8}$$

$$v_{cq\_n} = \tfrac{1}{2} V_{dc} \times m_{q\_n} \tag{9}$$

It will be understood that where no filter is present, the values of $v_{cd\_n}$ and $v_{cq\_n}$ are equal to the values of $v_{sd\_n}$ and $v_{sq\_n}$. By using equations (8)-(9) in combination with equations (3)-(5), the voltage drop caused by the optional presence of a filter between the machine and the converter is inherently taken into consideration. Thus, this latter approach may provide greater flexibility or at least provide a more reliable or accurate calculation of $V_{dc\_min}$ than the approaches of equations (1)-(2) and (6)-(7).

In both of the two groups of embodiments described above, the specific way in which $v_{sd\_n}$ and $v_{sq\_n}$ (or $v_{cd\_n}$ and $v_{cq\_n}$ where relevant) can be determined from the machine operating speed will depend on the type of electrical machine being used. For example, the equations governing the values of $v_{sd\_n}$ and $v_{sq\_n}$ for a synchronous permanent magnet machine will differ from those governing the values of $v_{sd\_n}$ and $v_{sq\_n}$ for an induction machine. The present invention is not limited to any particular kind of machine: permanent magnet synchronous machines and induction machines could be used, as could be other types of machine including machines of the wound-field or switched-reluctance type. Further, the machines may be of the radial-flux, axial-flux or transverse-flux configuration.

In one specific example in which the n-th machine is of the synchronous permanent magnet type, $v_{sd\_n}$ and $v_{sq\_n}$ can be calculated using equations (10) and (11):

$$v_{sd\_n} = R_{s\_n} i_{sd\_n} + L_{d\_n} \frac{di_{sd\_n}}{dt} - \omega_{e\_n} L_{q\_n} i_{sq\_n} \tag{10}$$

$$v_{sq\_n} = R_{s\_n} i_{sq\_n} + L_{q\_n} \frac{di_{sq\_n}}{dt} + \omega_{e\_n} L_{d\_n} i_{sd\_n} + \omega_{e\_n} \Psi_{f\_n} \tag{11}$$

In equations (10) and (11) the following quantities, which may be measured, pre-defined and stored in memory for calculation purposes, or derived from measured and pre-defined quantities, are used:

$R_{s\_n}$=stator resistance;
$L_{d\_n}$ and $L_{q\_n}$=stator inductance in the dq reference frame;
$\omega_{e\_n}$=synchronous frequency;
$\Psi_{f\_n}$=flux linkage; and $i_{sd\_n}$ and $i_{sq\_n}$=stator current in the dq reference frame.

In another specific example in which the n-th machine is of the induction type, $v_{sd\_n}$ and $v_{sq\_n}$ may be calculated using equation (12), which utilizing equation (13) becomes equation (14):

$$v_{sd\_n} = R_{s\_n} i_{sd\_n} + \frac{d\psi_{sd\_n}}{dt} - \omega_{e\_n} \psi_{sq\_n} \tag{12}$$

$$v_{sq\_n} = R_{s\_n} i_{sq\_n} + \frac{d\psi_{sq\_n}^{dt}}{dt} + \omega_{e\_n} \psi_{sd\_n}$$

$$\psi_{sd\_n} = \sigma_n L_{s\_n} i_{sd\_n} + \frac{L_{m\_n}}{L_{r\_n}} \psi_{rd\_n} \tag{13}$$

$$\psi_{sq\_n} = \sigma_n L_{s\_n} i_{sq\_n} + \frac{L_{m\_n}}{L_{r\_n}} \psi_{rq\_n}$$

$$v_{sd\_n} = R_{s\_n} i_{sd\_n} + \sigma_n L_{s\_n} \frac{di_{sd\_n}}{dt} + \tag{14}$$

$$\frac{L_{m\_n}}{L_{r\_n}} \frac{d\psi_{rd\_n}}{dt} - \omega_{e\_n} \left( \sigma_n L_{s\_n} i_{sq\_n} + \frac{L_{m\_n}}{L_{r\_n}} \psi_{rq\_n} \right)$$

$$v_{sq\_n} = R_{s\_n} i_{sq\_n} + \sigma_n L_{s\_n} \frac{di_{sq\_n}}{dt} + \frac{L_{m\_n}}{L_{r\_n}} \frac{d\psi_{rq\_n}}{dt} +$$

$$\omega_{e\_n} \left( \sigma_n L_{s\_n} i_{sd\_n} + \frac{L_{m\_n}}{L_{r\_n}} \psi_{rd\_n} \right)$$

In equations (12)-(14), the following quantities, which as before may be measured, pre-defined and stored in memory for calculation purposes, or derived from measured and pre-defined quantities, are used:

$R_{s\_n}$=stator resistance;

$L_{s\_n}$ and $L_{r\_n}$=stator and rotor self-inductances;

$L_{m\_n}$=magnetization inductance;

$\sigma_n L_{s\_n}$=total leakage inductance;

$\omega_{e\_n}$=synchronous frequency;

$i_{sd\_n}$ and $i_{sq\_n}$=stator current in the dq reference frame;

$\Psi_{sd\_n}$ and $\Psi_{sq\_n}$=stator fluxes in the dq reference frame; and $\Psi_{rd\_n}$ and $\Psi_{rq\_n}$=rotor fluxes in the dq reference frame.

Those skilled in the art will appreciate that equations (10)-(14) can be adapted to determine the converter ac terminal voltage values $v_{cd\_n}$ and $v_{cq\_n}$, if desired. Furthermore, FIGS. 4 and 5, described below, illustrate control schemes in which suitable values $v_d$ and $v_q$ are derived from measured and pre-defined values.

In summary, embodiments of the present invention use the present operating speeds of each of the N electrical machines to determine a present minimum bus voltage requirement $V_{dc\_min}$. A voltage setting value $V_{dc\_bus}$ greater than or equal to $V_{dc\_min}$ is then selected. The present invention is not limited to a specific method of determining $V_{dc\_min}$ from the N values of the machine speed, and the specific method may depend, to some extent, on implementation details such as the number of electrical phases of the electric machines and the types of machines used.

As mentioned above, at step 55 the controller 17 will select a value of $V_{dc\_bus}$ that is greater than or equal to $V_{dc\_min}$. In many practical implementations it would be desirable to set $V_{dc\_bus}$ to be greater than $V_{dc\_min}$ to allow room for dynamic control and variation of the bus voltage about the nominal setting $V_{dc\_bus}$. In many cases a value of $V_{dc\_bus}$ approximately equal to 1.05 times $V_{dc\_min}$ would strike a workable balance between providing room for dynamic control above $V_{dc\_min}$ and ensuring that the bus voltage is kept low enough that the advantages associated with a low bus voltage are still attained to a meaningful degree. Values other than 1.05 could be used, however.

Returning to FIG. 2, at 56, having determined $V_{dc}$ mil and selected $V_{dc\_bus}$, the controller provides control signals to the converters, particularly the rectifiers 21-24, to implement the selected bus voltage setting $V_{dc\_bus}$. The process then returns to 51, where the controller 17 receives a new thrust demand and repeats steps 52-56 to select an updated bus voltage setting.

Advantages associated with the approach described above, which may reduce the bus voltage to a level that is relatively low but high enough for reliable operation, may include:

a reduction in the switching losses of the AFE rectifiers and VFD inverters whilst keeping conduction losses low and possibly unchanged;

increased life and reliability of the semiconductor converters;

a reduction in the total harmonic distortion (THD) of the current in the generators and motors;

reduced electromagnetic interference (EMI) as a consequence of a reduction in dv/dt; and increased machine bearing life resulting from the reduced EMI.

FIG. 3

The delivery of power from the variable-voltage DC bus 15 to the loads typically results in a voltage drop on the bus, commonly known as voltage droop. To account for this, the controller 17 may optionally, at step 55 of FIG. 2, further determine a voltage droop $\Delta V$ setting for the selected bus voltage setting $V_{dc\_bus}$.

Figure 3:
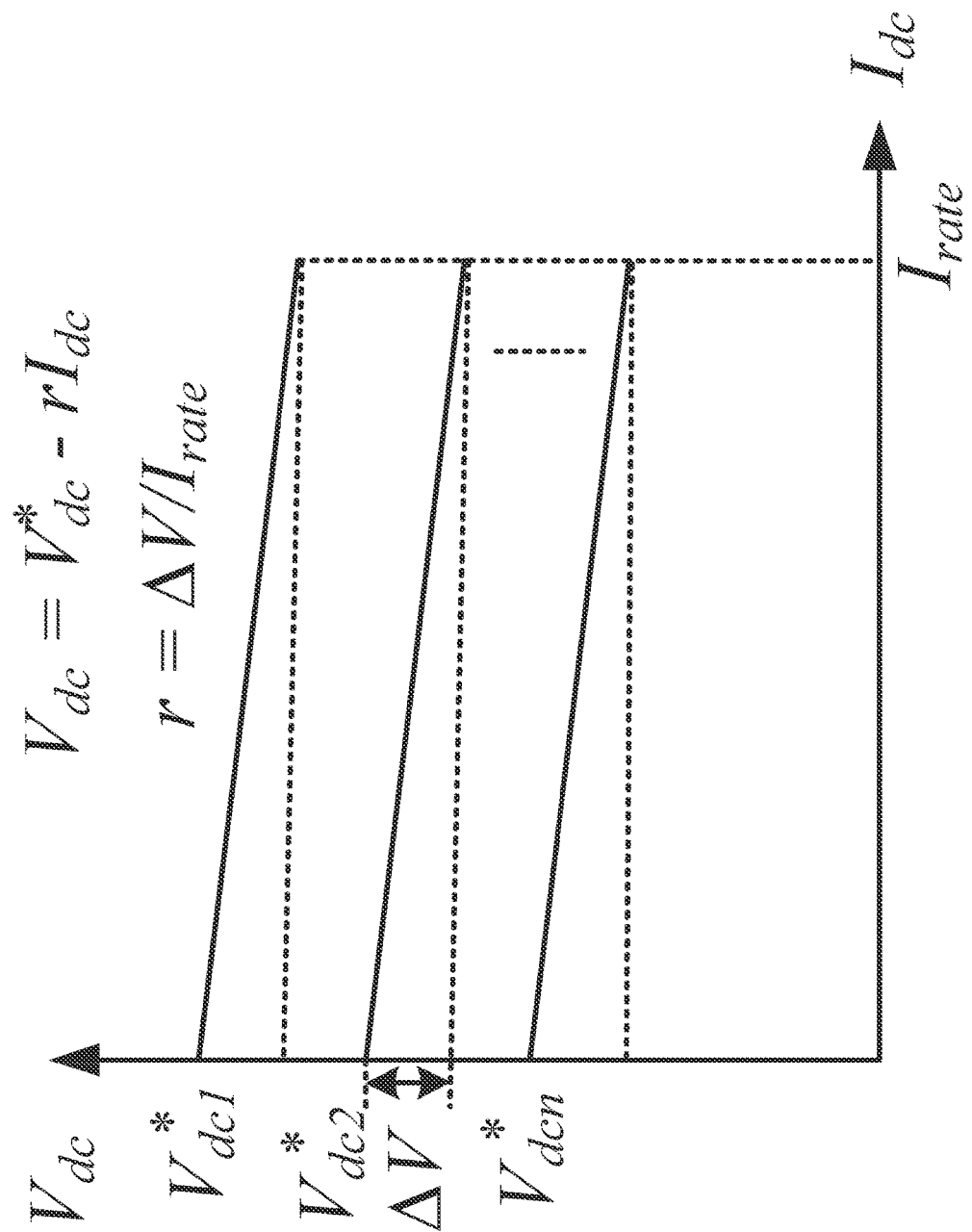
FIG. 3 is a graph illustrating voltage droop characteristics associated with various voltage settings of a variable-voltage DC bus.

FIG. 3 illustrates exemplary voltage droop characteristics associated with three exemplary bus voltage settings. As can be seen, each of the illustrated voltage droop lines has the same slope ($r=\Delta V/I_{rate}$) but a different voltage $V^*_{dc1}$, $V^*_{dc2}$, $V^*_{dcn}$ at no load condition. Based on the selected voltage setting $V_{dc\_bus}$ and the present bus current $I_{dc}$, the controller 17 can determine a droop value $\Delta V$. The controller 17 may then, at step 56, provide the droop value $\Delta V$ to the converters along with the selected voltage setting $V_{dc\_bus}$ to implement control of the bus voltage. Equally, at step 55, the controller 17 may modify the selected voltage setting $V_{dc\_bus}$ using the determined droop $\Delta V$ and provide the modified voltage setting ($V_{dc\_bus} - \Delta V$, for example) to the converters at step 56.

Whilst FIG. 3 illustrates three voltage droop characteristic lines, it will be understood that the controller 17 may be pre-configured with (store in memory, for example) any suitable number of voltage droop characteristic relationships covering any suitable region of the electrical power system operating space.

This use of DC voltage droop control may facilitate equal sharing of the power demand between multiple generators G1-G4 without requiring any communication amongst the rectifiers 21-24. In alternative arrangements, for example where primary/secondary control is used, $\Delta V$ may be set to zero since only one rectifier (the primary) needs to be involved with the regulation of the DC bus voltage with the other rectifiers (the secondaries) working in power control mode with a power reference determined by the controller 17. The use of DC voltage droop control is, however, advantageous compared to the primary/second control arrangement in that the DC voltage droop control system can continue to work without interruption in the event that any given generator and/or rectifier fails. A primary/secondary control arrangement is vulnerable to failure of the primary generator and/or rectifier.

FIG. 4

As explained above, the controller 17 uses the present operating speeds of the machines to determine a minimum bus voltage requirement $V_{dc\_min}$ and selects a bus voltage setting $V_{dc\_bus}$. Having selected the bus voltage setting $V_{dc\_bus}$, the controller 17 provides control signals to the converters, particularly the rectifiers 21-24, to implement the selected voltage setting $V_{dc\_bus}$.

Figure 4:
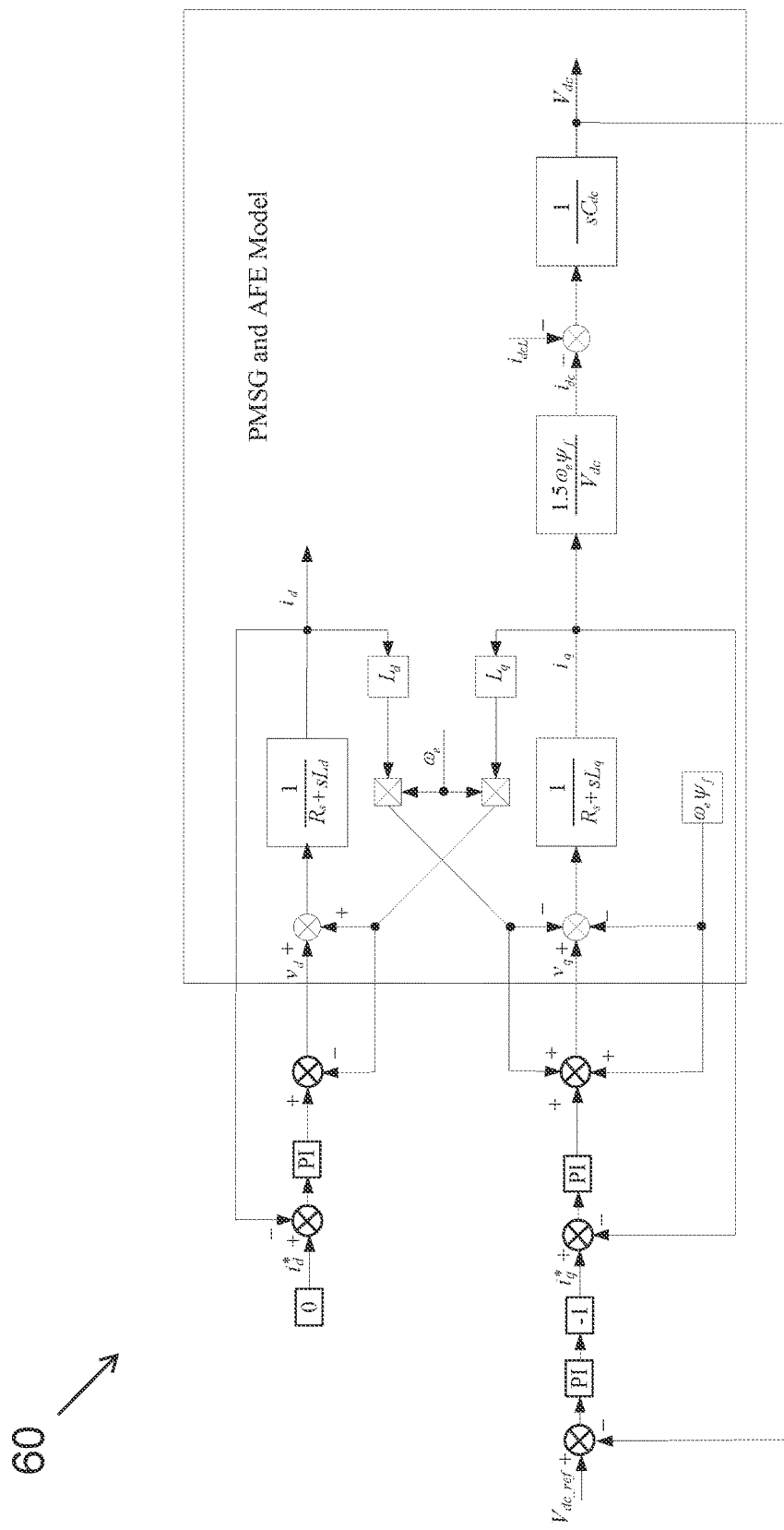
FIG. 4 is a schematic diagram illustrating a control scheme for controlling an active front end rectifier associated with a permanent magnet synchronous generator in order to control the voltage setting on a variable-voltage DC bus.

By way of example only, FIG. 4 illustrates a control loop 60 for controlling an AFE rectifier that receives alternating current from a permanent magnet synchronous generator. The control loop 60 may be used independently for each of the rectifiers connected to the bus 15 to implement the selected bus voltage setting $V_{dc\_bus}$.

As can be seen from FIG. 4, one input of the control loop 60 is a voltage reference value, $V_{dc\_ref}$, which is equal to the newly selected bus voltage setting $V_{dc\_bus}$ that has been determined based on the present operating speeds of all of the machines. Another input of the control loop 60 is $V_{dc}$, which in FIG. 4 is the present, measured, value of the output voltage of the rectifier. The difference between these two values, $V_{dc\_ref} - V_{dc}$, is input to the loop and the eventual output is an updated value of the output voltage of the rectifier, $V_{dc}$. This loop 60 continues until $V_{dc} = V_{dc\_ref}$.

FIG. 4 uses standard notation. Values with * superscript are reference values. Values with "d" and "q" subscript are values in the dq reference frame of the electrical machine. Lower case "s" is the Laplacian operator.

$V_{dc\_ref}$=target voltage, equal to the selected bus voltage setting;
$V_{dc}$=present output voltage of the rectifier;
$\omega_e$=synchronous frequency;
$i_d$ and $i_q$=stator current in the dq reference frame;
$v_d$ and $v_q$=stator voltage in the dq reference frame;
$R_s$=stator resistance;
$L_d$ and $L_q$=stator inductance in the dq reference frame;
$\Psi_f$=flux linkage;
$T_e$=electromagnetic torque
$T_L$=load torque;
p=pole pairs;
B=friction coefficient; and
J=rotor inertia.

FIG. 5

As explained above, the specific way in which the system determines appropriate speeds for the motors M1-M4, for example speeds for meeting a system thrust demand, is beyond the scope of the present disclosure. FIG. 5, however, shows a control scheme 70 which may be used to control the motor speed and current for a motor-inverter pairing. In this example the motor is a three-phase permanent magnet synchronous motor such as the motors M1-M4 described above with reference to FIG. 1.

As will be understood by those skilled in the art, the motors M1-M4 may be controlled according to either a torque control mode or a speed control mode. FIG. 5 illustrates both modes of control, with the switch located at the bottom left of the control loop representing the selection of one of the two modes (mode 1 being torque control, mode 2 being speed control).

FIG. 5 uses standard notation. Values with * superscript are reference values. Values with "d" and "q" subscript are values in the dq reference frame of the electrical machine. Lower case "s" is the Laplacian operator.

$\omega_r$=rotor angular speed;
$\omega_e$=synchronous frequency;
$i_d$ and $i_q$=stator current in the dq reference frame;
$v_d$ and $v_q$=stator voltage in the dq reference frame;
$R_s$=stator resistance;
$L_d$ and $L_q$=stator inductance in the dq reference frame;
$\Psi_f$=flux linkage;
$T_e$=electromagnetic torque;
$T_L$=load torque;
p=pole pairs;
B=friction coefficient; and
J=rotor inertia.

As can be seen, the speed and torque control modes differ in their use of either an input reference speed ($\omega^*_r$, speed control) or an input reference torque ($T^*_e$, torque control), but both versions of the control loop output updated values for the rotor speed $\omega_r$ and stator current $i_d$. The updated value of ωr may be provided to the controller 17 for use in determining an updated value of the bus voltage $V_{dc\_bus}$, as explained above.

FIG. 6

Whilst FIG. 1 illustrates a distributed propulsion system 10 having four generators G1-G4 and four motors M1-M4, it is to be understood that the electrical power systems and control methods described herein are not so limited. Generally speaking, the invention may be applied to any electrical power system having a variable-voltage DC bus and a plurality of electrical machines connected thereto by appropriate AC-DC and/or DC-AC converters.

Figure 6:
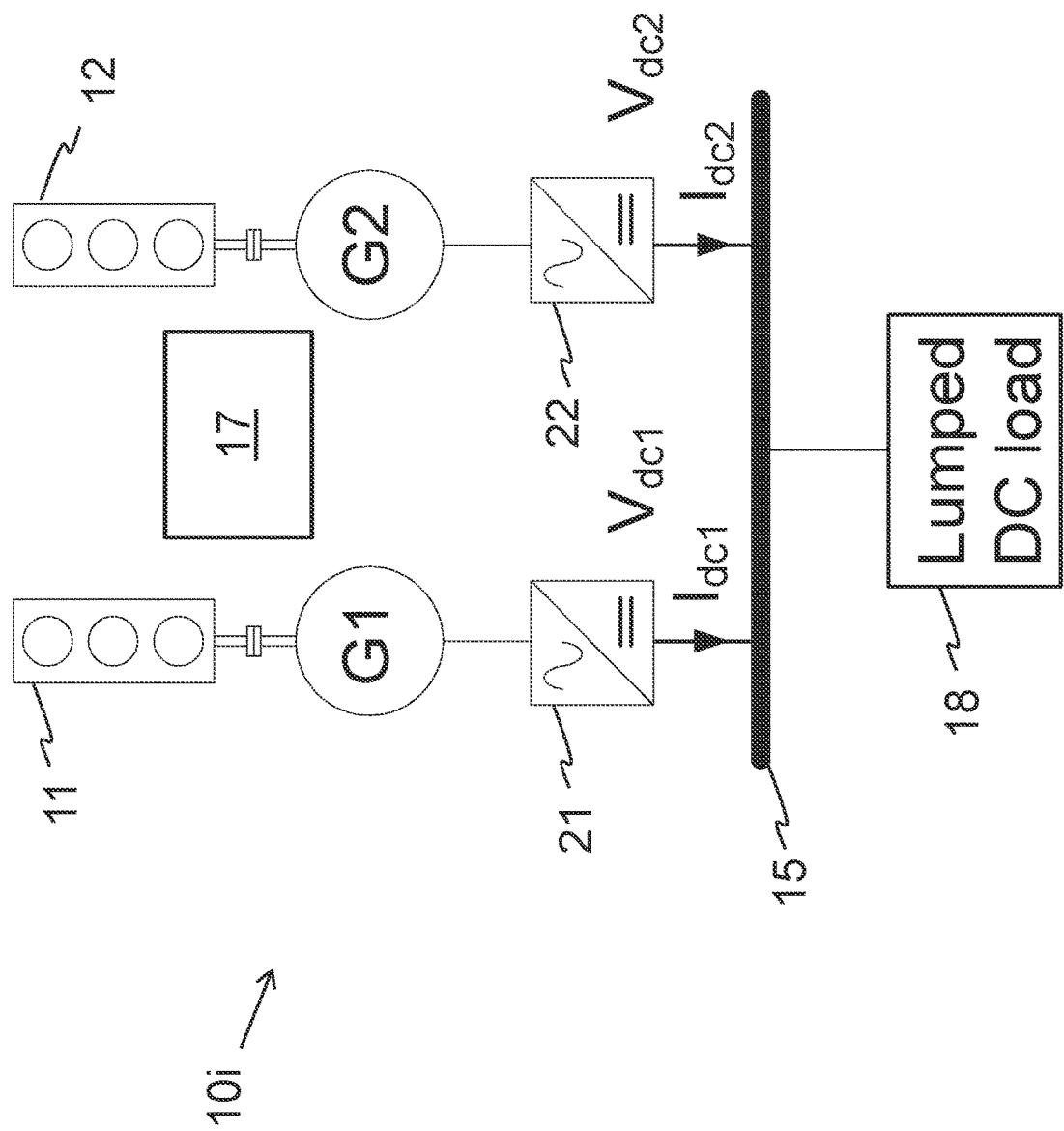
FIG. 6 is a schematic illustration of another electrical power system having a variable-voltage DC bus.

To illustrate, FIG. 6 shows another exemplary system 10i in which a variable-voltage DC bus 15 receives electrical power from two generators G1, G2 and associated AC-DC converters 21, 22 and delivers electrical power to one or more DC loads, illustrated as a single lumped DC load 18. Thus, in the example system 10i of FIG. 6, there are no motors. Instead, each of the plurality of electrical machines G1, G2 is a generator and the electrical power demand of the system will be dictated by the DC electrical loads 18.

It will be appreciated that steps 51 and 52 of the method 50 of FIG. 2 do not occur when the method 50 is applied to the system 10i of FIG. 6, since there are no motors in the system 10i of FIG. 6.

In this example, the controller 17 determines or receives an indication of the present electrical power demand required by the DC loads 18. Based on the power demand, the controller will determine appropriate operating parameters for the engines 11, 12, preferably so as to optimize to the SFCs of the engines 11, 12. In doing so, the controller 17 will also set speeds for generators G1, G2.

The controller 17 will then determine a minimum DC voltage setting requirement, $V_{dc\_min}$, for the variable-voltage bus 15 using the speed settings for the generators G1, G2. For instance, the controller 17 may use equations (1)-(2) or (3)-(5) to determine $V_{dc\_min}$. The controller 17 will then select an actual voltage setting $V_{dc\_bus}$ for the bus, $V_{dc\_bus}$ being greater than or equal to $V_{dc\_min}$.

In most cases the selection will be such that $V_{dc\_bus} > V_{dc\_min}$ so as to provide a margin for dynamic control of the voltage setting. Account may be taken of the voltage droop $\Delta V$. The controller will then provide control signals to the rectifiers 21-22, for example using the control scheme 60 described with reference to FIG. 4 for each rectifier, to implement the selected bus voltage setting $V_{dc\_bus}$.

Various modifications could be made to the exemplary systems 10, 10i. For example, any of the following may apply alone and in combination:

a) The total number of electrical machines in the electrical power system may be any number N≥2. Generally speaking, at least one of the N machines will be configured as or configurable as a generator for supplying the variable-voltage bus with electrical power. A machine with a single rotor but multiple independent windings (for example a machine with a dual-wound stator) connected to independent converters may be considered multiple machines.
b) One or more, for example all, of the N electrical machines may be motor-generators, capable of being configured as either a generator or a motor. In this case, the associated converter can be a bi-directional converter capable of converting AC to DC (rectifier mode) and converting DC to AC (inverter mode). For example, each of the N converters may be formed of a rectifier and an inverter connected to the associated machine in anti-parallel.
c) Whilst FIGS. 1 and 6 show an equal number of engines and generators, this need not be the case. For example, a gas turbine engine typically includes plural shafts (a high pressure shaft and a low pressure shaft, for example), and so generators may be drivably coupled to different shafts of the same gas turbine engine. Further, multiple generators could be coupled to the same shaft of a gas turbine or a reciprocating engine.
d) Likewise, whilst FIG. 1 shows one motor per propulsor, one propulsor may be associated with plural motors. Multiple motor rotors may be coupled to a common propulsor shaft, or to different shafts of the same propulsor (where the propulsor is itself a gas turbine engine having plural shafts, for example).
e) If present, motors may be propulsive loads (a motor powering a propulsor, for example), non-propulsive loads (a motor powering an electric fuel pump, oil pump or cabin blower, for example) or a mixture of the two.
f) Each of the electrical machines may be of the same or different type and specification. For example, some of the machines may be permanent magnet machines whereas others may be induction machines. Likewise, the machines may have different power ratings, different winding arrangements and the like.
g) Motors and/or DC loads may be connected to the variable-voltage bus.
h) The variable-voltage DC bus may also receive DC electrical power from and/or deliver electrical power to an electrical power storage unit such as a battery or a capacitor. For instance, vehicle batteries may be charged from the DC bus when not required, and at other times the batteries may be discharged to deliver power to the DC bus in order to rapidly adjust to a changing electrical power demand. The determination of the electrical system power demand may take account of the electrical power storage units.
i) The controller 17 may be a FADEC responsible for controlling the engines and the electrical power system including the electrical machines, converters and the voltage setting $V_{dc\_bus}$. In other embodiments, however, responsibility for the various control aspects may be distributed amongst a number of different controllers. Each control function may be implemented in hardware and/or software, and may be a hardware and/or software module of a controller.

Other variations will occur to those skilled in the art.

FIG. 7

As noted above, the engines 11-14 connected to the generators G1-G4 in the systems 10, 10i described herein may be gas turbine engines. By way of example only, a general arrangement of an engine 101 for an aircraft is shown in FIG. 7.

Figure 7:
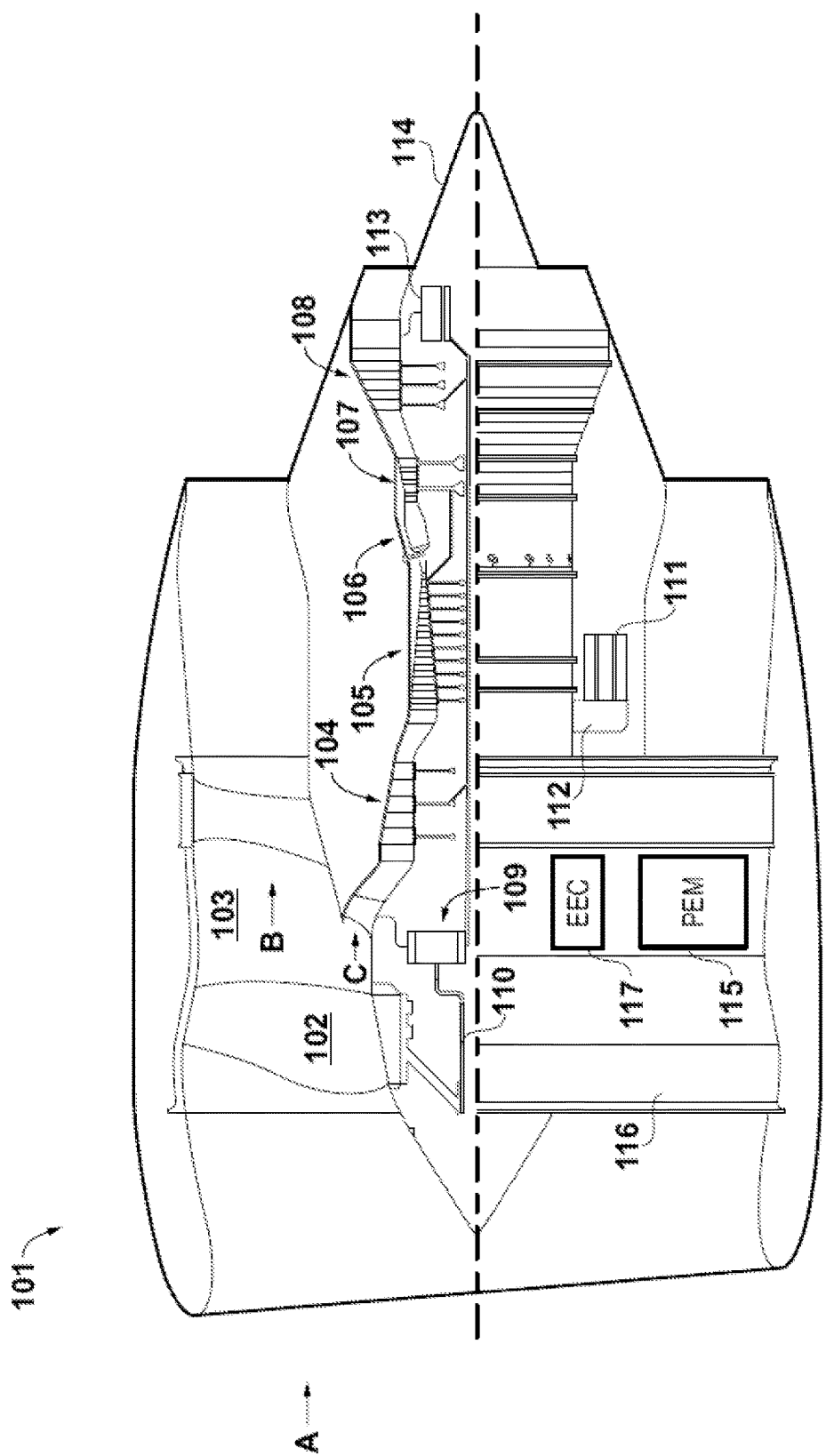
FIG. 7 is a schematic illustration of a gas turbine engine.

The engine 101 of FIG. 7 is of turbofan configuration, and thus comprises a ducted fan 102 that receives intake air A and generates two pressurised airflows: a bypass flow B which passes axially through a bypass duct 103 and a core flow C which enters a core gas turbine.

The core gas turbine comprises, in axial flow series, a low-pressure compressor 104, a high-pressure compressor 105, a combustor 106, a high-pressure turbine 107, and a low-pressure turbine 108.

In operation, the core flow C is compressed by the low-pressure compressor 104 and is then directed into the high-pressure compressor 105 where further compression takes place. The compressed air exhausted from the high-pressure compressor 105 is directed into the combustor 106 where it is mixed with fuel and the mixture is combusted. The resultant hot combustion products then expand through, and thereby drive, the high-pressure turbine 107 and in turn the low-pressure turbine 108 before being exhausted to provide a small proportion of the overall thrust.

The high-pressure turbine 107 drives the high-pressure compressor 105 via an interconnecting shaft. The low-pressure turbine 108 drives the low-pressure compressor 104 via another interconnecting shaft. Together, the high-pressure compressor 105, high-pressure turbine 107, and associated interconnecting shaft form part of a high-pressure spool of the engine 101. Similarly, the low-pressure compressor 104, low-pressure turbine 108, and associated interconnecting shaft form part of a low-pressure spool of the engine 101. Such nomenclature will be familiar to those skilled in the art.

The fan 102 is driven by the low-pressure turbine 108 via a reduction gearbox in the form of a planetary-configuration epicyclic gearbox 109. Thus in this configuration, the low-pressure turbine 108 is connected with a sun gear of the gearbox 109. The sun gear is meshed with a plurality of planet gears located in a rotating carrier, which planet gears are in turn are meshed with a static ring gear. The rotating carrier drives the fan 102 via a fan shaft 110.

It will be appreciated that in alternative embodiments a star-configuration epicyclic gearbox (in which the planet carrier is static and the ring gear rotates and provides the output) may be used instead.

In this example engine 101, in order to facilitate electrical generation by the engine 101, a first rotary electric machine 111 capable of operating both as a motor and generator is mechanically coupled with the high-pressure spool. In the present example, the first electric machine 111 is coupled to the high-pressure spool via a high-pressure spool driven, core-mounted accessory gearbox 112 of conventional drive configuration. Thus, as well as operation as a generator to supply an aircraft on which the engine 101 is installed with electrical power, the first electric machine 111 may drive the high-pressure spool to facilitate starting of the engine 101 in place of an air turbine starter, and may also drive it in certain flight phases to improve operability, fuel consumption, etc.

In alternative examples, the first electric machine 111 may be mounted coaxially with the turbomachinery in the engine 101. For example, the first electric machine 111 may be mounted axially in line with the duct between the low- and high-pressure compressors 104 and 105.

Similarly, a second rotary electric machine 113 capable of operating both as a motor and generator is mechanically coupled with the low-pressure spool. In the present example, the second electric machine 113 is mounted in the tail cone 114 of the engine 101 coaxially with the turbomachinery and is coupled to the low-pressure turbine 108. In alternative embodiments, the second rotary electric machine 113 may be located axially in line with low-pressure compressor 104, which may adopt a bladed disc or bladed drum configuration to provide space for the second rotary electric machine 113.

It will of course be appreciated by those skilled in the art that any other suitable location for the first and second electric machines may be adopted.

The first and second electric machines are connected with power electronics. Extraction of power from, or application of power to, the electric machines is performed by a power electronics module (PEM) 115. In the present example, the PEM 115 is mounted on the fan case 116 of the engine 101, but it will be appreciated that it may be mounted elsewhere such as on the core of the gas turbine, or in the vehicle to which the engine 101 is attached, for example.

Control of the PEM 115 and of the first and second electric machines 111 and 113 is in the present example performed by an engine electronic controller (EEC) 117. In the present example the EEC 117 is a full-authority digital engine controller (FADEC).

In the specific example, the internal configuration of PEM 115 allows transfer of electric power between the first electric machine 111 and second electric machine 113. In this way, the turbomachinery may be designed to exploit the attendant advantages conferred by transfer of power between the high-pressure spool and the low-pressure spool. For example, transfer of power from the low-pressure spool to the high-pressure spool during the approach phase reduces the effective thrust of the engine 101 whilst maintaining sufficient high-pressure spool rotational speed to safely initiate a go-around manoeuvre. Further, in engine 101, transfer of power from the high-pressure spool to the low-pressure spool during a deceleration manoeuvre reduces the risk of weak extinction, therefore enabling a more optimal combustor design.

Various embodiments of the engine 101 may include one or more of the following features.

It will be appreciated that instead of being a turbofan having a ducted fan arrangement, the engine 101 may instead be a turboprop comprising a propeller for producing thrust.

The low- and high-pressure compressors 104 and 105 may comprise any number of stages, for example multiple stages. Each stage may comprise a row of rotor blades and a row of stator vanes, which may be variable stator vanes (in that their angle of incidence may be variable). In addition to, or in place of, axial stages, the low- or high-pressure compressors 104 and 105 may comprise centrifugal compression stages.

The low- and high-pressure turbines 107 and 108 may also comprise any number of stages.

The fan 102 may have any desired number of fan blades, for example 16, 18, 20, or 22 fan blades.

Each fan blade may be defined as having a radial span extending from a root (or hub) at a radially inner gas-washed location, or 0 percent span position, to a tip at a 100 percent span position. The ratio of the radius of the fan blade at the hub to the radius of the fan blade at the tip—the hub-tip ratio—may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The hub-tip ratio may be in an inclusive range bounded by any two of the aforesaid values (i.e. the values may form upper or lower bounds). The hub-tip ratio may both be measured at the leading edge (or axially forwardmost) part of the blade. The hub-tip ratio refers, of course, to the gas-washed portion of the fan blade, i.e. the portion radially outside any platform.

The radius of the fan 102 may be measured between the engine centreline and the tip of a fan blade at its leading edge. The fan diameter may be greater than (or on the order of) any of: 2.5 metres, 2.6 metres, 2.7 metres, 2.8 metres, 2.9 metres, 3 metres, 3.1 metres, 3.2 metres, 3.3 metres, 3.4 metres, 3.5 metres, 3.6 metres, 3.7 metres, 3.8 metres or 3.9 metres. The fan diameter may be in an inclusive range bounded by any two of the aforesaid values (i.e. the values may form upper or lower bounds).

The rotational speed of the fan 102 may vary in use. Generally, the rotational speed is lower for fans with a higher diameter. Purely by way of non-limitative example, the rotational speed of the fan at cruise conditions may be less than 2500 rpm, for example 2300 rpm. Purely by way of further non-limitative example, the rotational speed of the fan 102 at cruise conditions for an engine having a fan diameter in the range of from 2.5 metres to 3 metres (for example 2.5 metres to 2.8 metres) may be in the range of from 1700 rpm to 2500 rpm, for example in the range of from 1800 rpm to 2300 rpm, or, for example in the range of from 1900 rpm to 2100 rpm. Purely by way of further non-limitative example, the rotational speed of the fan at cruise conditions for an engine having a fan diameter in the range of from 3.2 metres to 3.8 metres may be in the range of from 1200 rpm to 2000 rpm, for example in the range of from 1300 rpm to 1800 rpm, for example in the range of from 1400 rpm to 1600 rpm.

In use of the engine 101, the fan 102 (with its associated fan blades) rotates about a rotational axis. This rotation results in the tip of the fan blade moving with a velocity $U_{tip}$. The work done by the fan blades on the flow results in an enthalpy rise dH of the flow. A fan tip loading may be defined as $dH/U_{tip}^2$, where dH is the enthalpy rise (for example the one-dimensional average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4. The fan tip loading may be in an inclusive range bounded by any two of the values in the previous sentence (i.e. the values may form upper or lower bounds).

The engine 101 may have any desired bypass ratio, where the bypass ratio is defined as the ratio of the mass flow rate of the flow B through the bypass duct to the mass flow rate of the flow C through the core at cruise conditions. Depending upon the selected configuration, the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the aforesaid values (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of the engine 101 may be defined as the ratio of the stagnation pressure upstream of the fan 102 to the stagnation pressure at the exit of the high-pressure compressor 105 (before entry into the combustor). By way of non-limitative example, the overall pressure ratio of the engine 101 at cruise may be greater than (or on the order of) any of the following: 35, 40, 45, 50, 55, 60, 65, 70, 75. The overall pressure ratio may be in an inclusive range bounded by any two of the aforesaid values (i.e. the values may form upper or lower bounds).

Specific thrust of the engine 101 may be defined as the net thrust of the engine divided by the total mass flow through the engine 101. At cruise conditions, the specific thrust of the engine 101 may be less than (or on the order of) any of the following: 110 Nkg$^{-1}$s, 105 Nkg$^{-1}$s, 100 Nkg$^{-1}$s, 95 Nkg$^{-1}$s, 90 Nkg$^{-1}$s, 85 Nkg$^{-1}$s, or 80 Nkg$^{-1}$s. The specific thrust may be in an inclusive range bounded by any two of the values in the previous sentence (i.e. the values may form upper or lower bounds). Such engines may be particularly efficient in comparison with conventional gas turbine engines.

The engine 101 may have any desired maximum thrust. For example, the engine 101 may be capable of producing a maximum thrust of at least (or on the order of) any of the following: 160 kilonewtons, 170 kilonewtons, 180 kilonewtons, 190 kilonewtons, 200 kilonewtons, 250 kilonewtons, 300 kilonewtons, 350 kilonewtons, 400 kilonewtons, 450 kilonewtons, 500 kilonewtons, or 550 kilonewtons. The maximum thrust may be in an inclusive range bounded by any two of the aforesaid values (i.e. the values may form upper or lower bounds). The thrust referred to above may be the maximum net thrust at standard atmospheric conditions at sea level plus 15 degrees Celsius (ambient pressure 101.3 kilopascals, temperature 30 degrees Celsius), with the engine 101 being static.

In use, the temperature of the flow at the entry to the high-pressure turbine 107 may be particularly high. This temperature, which may be referred to as turbine entry temperature or TET, may be measured at the exit to the combustor 106, for example immediately upstream of the first turbine vane, which itself may be referred to as a nozzle guide vane. At cruise, the TET may be at least (or on the order of) any of the following: 1400 kelvin, 1450 kelvin, 1500 kelvin, 1550 kelvin, 1600 kelvin or 1650 kelvin. The TET at cruise may be in an inclusive range bounded by any two of the aforesaid values (i.e. the values may form upper or lower bounds). The maximum TET in use of the engine 101 may be, for example, at least (or on the order of) any of the following: 1700 kelvin, 1750 kelvin, 1800 kelvin, 1850 kelvin, 1900 kelvin, 1950 kelvin or 2000 kelvin. The maximum TET may be in an inclusive range bounded by any two of the aforesaid values (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium-based metal or an aluminium based material (such as an aluminium-lithium alloy) or a steel-based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium-based body with a titanium leading edge.

The fan 102 may comprise a central hub portion, from which the fan blades may extend, for example in a radial direction. The fan blades may be attached to the central portion in any desired manner. For example, each fan blade may comprise a fixture which may engage a corresponding slot in the hub. Purely by way of example, such a fixture may be in the form of a dovetail that may slot into and/or engage a corresponding slot in the hub/disc in order to fix the fan blade to the hub. By way of further example, the fan blades maybe formed integrally with a central hub portion. Such an arrangement may be a bladed disc or a bladed ring. Any suitable method may be used to manufacture such a bladed disc or bladed ring. For example, at least a part of the fan blades may be machined from a billet and/or at least part of the fan blades may be attached to the hub/disc by welding, such as linear friction welding.

The engine 101 may be provided with a variable area nozzle (VAN). Such a variable area nozzle may allow the exit area of the bypass duct to be varied in use. The general principles of the present disclosure may apply to engines with or without a VAN.

As used herein, cruise conditions have the conventional meaning and would be readily understood by those skilled in the art.

Such cruise conditions may be conventionally defined as the conditions at mid-cruise, for example the conditions experienced by the aircraft and/or engine at the midpoint (in terms of time and/or distance) between top of climb and start of descent. Cruise conditions thus define an operating point of the gas turbine engine which provides a thrust that would ensure steady state operation (i.e. maintaining a constant altitude and constant Mach number) at mid-cruise of an aircraft to which it is designed to be attached, taking into account the number of engines provided to that aircraft. For example, where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach number are known, and thus the operating point of the engine at cruise conditions is clearly defined.

The cruise conditions may correspond to ISA standard atmospheric conditions at an altitude that is in the range of from 10000 to 15000 metres, such as from 10000 to 12000 metres, or from 10400 to 11600 metres (around 38000 feet), or from 10500 to 11500 metres, or from 10600 to 11400 metres, or from 10700 metres (around 35000 feet) to 11300 metres, or from 10800 to 11200 metres, or from 10900 to 11100 metres, or 11000 metres. The cruise conditions may correspond to standard atmospheric conditions at any given altitude in these ranges.

The forward speed at the cruise condition may be any point in the range of from Mach 0.7 to 0.9, for example one of Mach 0.75 to 0.85, Mach 0.76 to 0.84, Mach 0.77 to 0.83, Mach 0.78 to 0.82, Mach 0.79 to 0.81, Mach 0.8, Mach 0.85, or in the range of from Mach 0.8 to 0.85. Any single speed within these ranges may be the cruise condition. For some aircraft, the cruise conditions may be outside these ranges, for example below Mach 0.7 or above Mach 0.9.

Thus, for example, the cruise conditions may correspond specifically to a pressure of 23 kilopascals, a temperature of minus 55 degrees Celsius, and a forward Mach number of 0.8.

It will of course be appreciated, however, that the principles of the invention claimed herein may still be applied to engines having suitable design features falling outside of the aforesaid parameter ranges.

It should also be noted that whilst a turbofan engine 101 for an aircraft has been described, it will be understood that the principles of the described electrical systems may be applied to other installations, for example in a marine environment such as on a naval vessel powered by gas turbines, or in an energy production environment such as in a power station utilising natural gas fired gas turbines, or any other suitable application.

Various examples have been described, each of which feature various combinations of features. It will be appreciated by those skilled in the art that, except where clearly mutually exclusive, any of the features may be employed separately or in combination with any other features and the invention extends to and includes all combinations and sub-combinations of one or more features described herein.

The invention claimed is:

1. An electrical power system having a DC bus with a variable voltage setting, the electrical power system comprising:
   a variable-voltage DC bus;
   a number N≥2 of electrical machines, each electrical machine connected to the variable-voltage DC bus via one of a corresponding number N of converters, each electrical machine and corresponding converter having an index n=(1, . . . , N); and
   a controller configured to select a voltage setting $V_{dc\_bus}$ for the variable-voltage DC bus and to provide control signals to the converters to control the voltage setting of the variable-voltage DC bus according to the selected voltage setting $V_{dc\_bus}$,
   wherein:
   a number P≥1 of the N electrical machines are configured as generators and the corresponding P converters are configured as AC-DC converters, each generator being operable to generate alternating current and to deliver direct current to the variable-voltage DC bus via the corresponding one of the AC-DC converters;
   a remaining number N−P≥0 of the N electrical machines are configured as motors and the corresponding N−P converters are configured as DC-AC converters, each motor being operable to receive alternating current from the variable-voltage DC bus via the corresponding one of the DC-AC converters; and
   the controller is configured to determine a minimum voltage requirement $V_{dc\_min}$ for the bus using present operating speeds of each of the N electrical machines and separately select the voltage setting $V_{dc\_bus}$ for the bus based on the determined $V_{dc\_min}$ so as to be different from and greater than the $V_{dc\_min}$.

2. The electrical power system of claim 1, in which the controller is configured to select the voltage setting $V_{dc\_bus}$ greater than $V_{dc\_min}$ to provide a margin for dynamic control of the voltage on the variable-voltage dc bus.

3. The electrical power system of claim 1, in which the controller is configured to select the voltage setting $V_{dc\_bus}$ satisfying $V_{dc\_min} < V_{dc\_bus} < 1.1 V_{dc\_min}$.

4. The electrical power system of claim 1, in which the controller is further configured to determine a voltage droop $\Delta V$ for the selected voltage setting $V_{dc\_bus}$ and to provide control signals to the converters to control the voltage setting of the variable-voltage DC bus according to both the selected voltage setting $V_{dc\_bus}$ and the determined droop $\Delta V$.

5. The electrical power system of claim 1, in which the number P of the N electrical machines configured as generators is greater than or equal to 2 such that an amount of electrical power delivered to the variable-voltage DC bus is shared amongst a plurality P of generators.

6. The electrical power system of claim 1, in which at least one of the N electrical machines is configured as a variable speed electrical machine.

7. The electrical power system of claim 1, in which the number of electrical machines configured as motors, N−P, is greater than or equal to 1, optionally greater than or equal to 2.

8. The electrical power system of claim 1, further comprising one or more DC electrical loads connected to the variable-voltage DC bus.

9. The electrical power system of claim 1, in which the controller is configured to determine the minimum voltage requirement $V_{dc\_min}$ according to:

$$V_{dc\_min} = \max(V_{dc\_min\_1}, \ldots, V_{dc\_min\_N})$$

wherein $V_{dc\_min\_n}$ is a minimum voltage requirement for the n-th electrical machine and is determined by the controller using the present operating speed of the n-th electrical machine.

10. The electrical power system of claim 9, in which the controller is configured to determine $V_{dc\_min\_n}$ according to:

$$V_{dc\_min\_n} = \sqrt{3} \times \sqrt{v_{sd\_n}^2 + v_{sq\_n}^2}$$

wherein $v_{sd\_n}$ and $v_{sq\_n}$ are stator terminal voltages of the n-th electrical machine in a dq reference frame and are determined by the controller using the present operating speed of the n-th electrical machine.

11. The electrical power system of claim 1, in which the controller is configured to determine the minimum voltage requirement $V_{dc\_min}$ according to:

$$V_{dc\_min} = m_{max}/k \times V_{dc}$$

$$m_{max} = \max(\max(m_1, \ldots, m_N))$$

wherein $m_n$ is a modulation index of the n-th converter and is determined by the controller using the present operating speed of the n-th electrical machine, k is a constant preferably equal to 1.15, and $V_{dc}$ is a converter DC-side voltage and is equal for all of the N converters.

12. The electrical power system of claim 11, in which the controller is configured to determine the modulation index $m_n$ of the n-th converter according to:

$$m_n = \sqrt{m_{d\_n}^2 + m_{q\_n}^2}$$

$$m_{d\_n} = 2v_{cd\_n}/V_{dc}$$

$$m_{q\_n} = 2v_{cq\_n}/V_{dc}$$

wherein $v_{cd\_n}$ and $v_{cq\_n}$ are converter ac-side terminal voltages of the n-th electrical machine in a dq reference frame and are determined by the controller using the present operating speed of the n-th electrical machine.

13. The electrical power system of claim 12, in which, for at least one of the N machines, a filter is provided between the machine and its corresponding converter.

14. The electrical power system of claim 1, further comprising at least one rotary engine having a drive shaft, wherein each of the P generators has a rotor drivably coupled to a drive shaft of one of the at least one rotary engines.

15. The electrical power system of claim 14, in which the at least one rotary engine is a gas turbine engine or a reciprocating engine.

16. A vehicle propulsion system comprising:
   the electrical power system of claim 1, in which the number N−P of the N electrical machines configured as motors is greater than or equal to 1 and each motor has a rotor; and
   at least one propulsor having a drive shaft, wherein the drive shaft of each propulsor is drivably coupled to a rotor of one of the motors.

17. The vehicle propulsion system of claim 16, in which the vehicle is an aircraft, a marine vessel or a train.

18. A vehicle comprising the vehicle propulsion system of claim 16.

19. A method of controlling a voltage setting $V_{dc\_bus}$ of a variable-voltage DC bus in an electrical power system comprising a number N≥2 of electrical machines, each electrical machine connected to the variable-voltage DC bus via one of a corresponding number N of converters, the method comprising:
   receiving, by a controller, for each of the N electrical machines, an indication of a present operating speed of the electrical machine;
   determining, by the controller, using the indications of the present operating speeds of all of the N electrical machines, a minimum voltage requirement $V_{dc\_min}$ for the bus;
   selecting, by the controller, the voltage setting $V_{dc\_bus}$ for the variable-voltage DC bus based on the determined $V_{dc\_min}$ so as to be different from and greater than the minimum voltage requirement $V_{dc\_min}$; and
   providing, by the controller, control signals to the converters to control the voltage setting of the variable-voltage DC bus according to the selected voltage setting $V_{dc\_bus}$.

20. A non-transitory computer-readable storage medium having instructions stored thereon for performing the method of claim 19.

* * * * *